April 24, 1934.    R. HOBBS    1,955,809
SAFETY BOX
Filed July 13, 1933    3 Sheets-Sheet 1
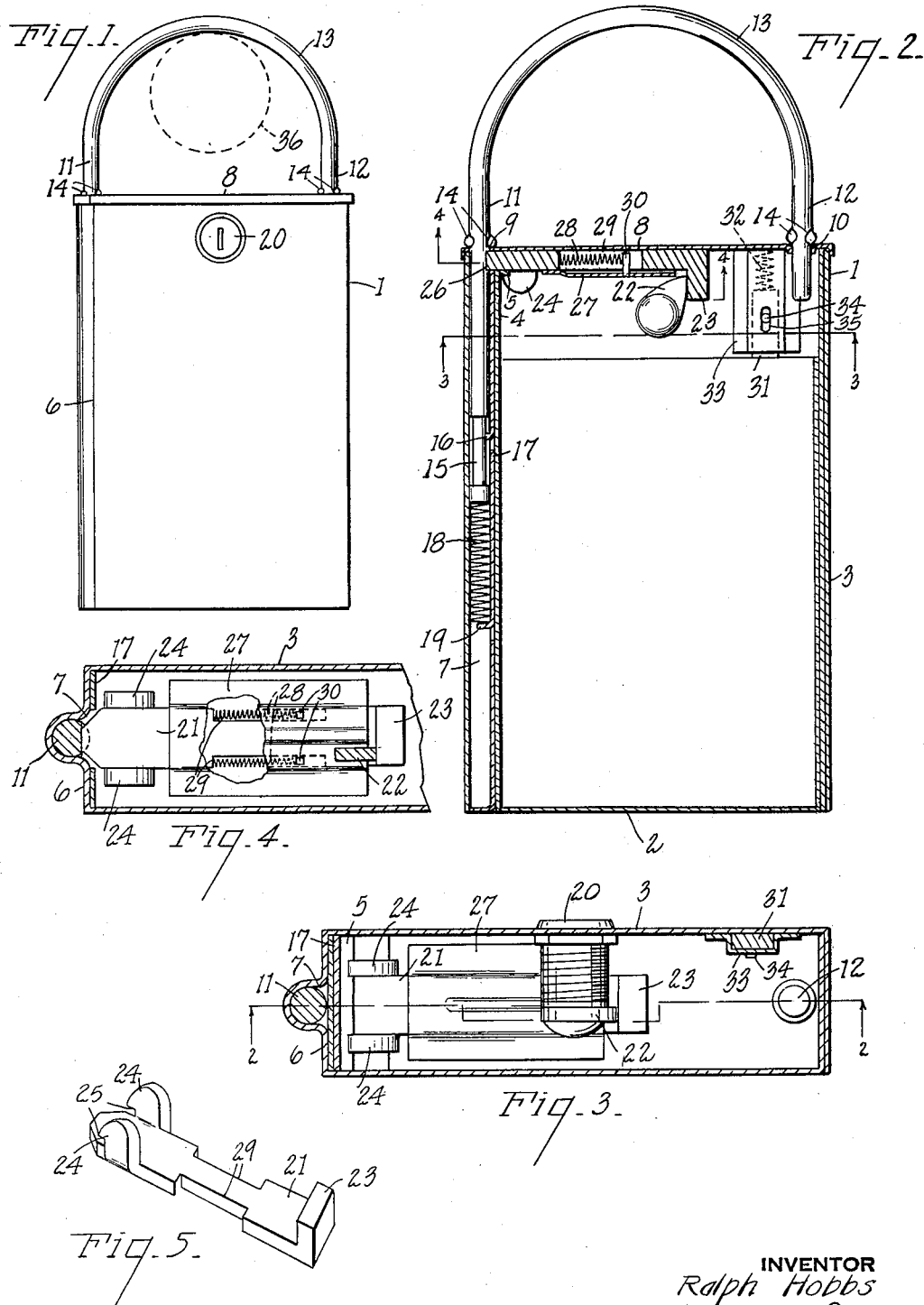
INVENTOR
Ralph Hobbs
BY
Chappell & Earl
ATTORNEYS April 24, 1934.   R. HOBBS   1,955,809
SAFETY BOX
Filed July 13, 1933   3 Sheets-Sheet 2
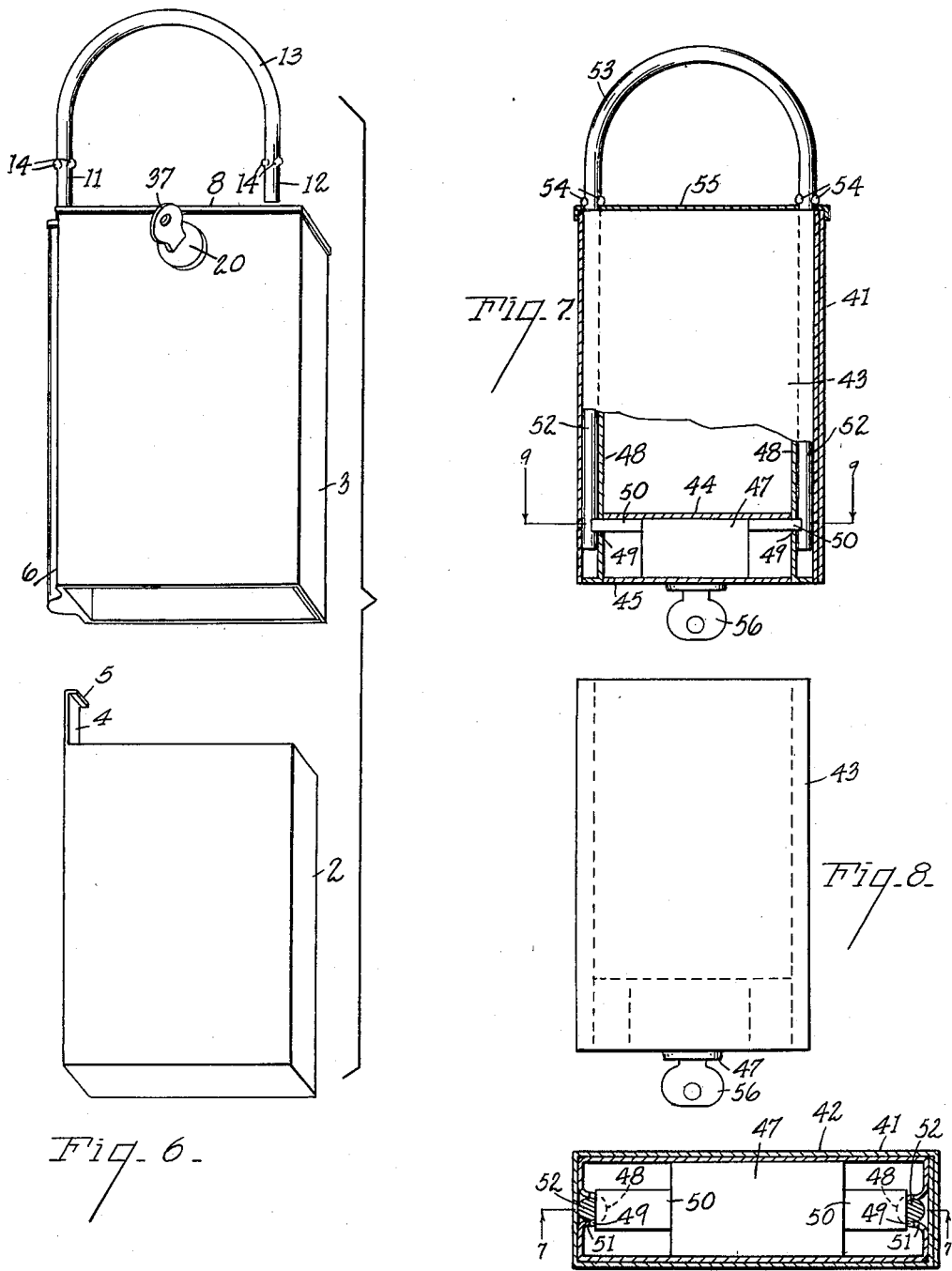
INVENTOR
Ralph Hobbs
BY
Chappell & Earl
ATTORNEYS

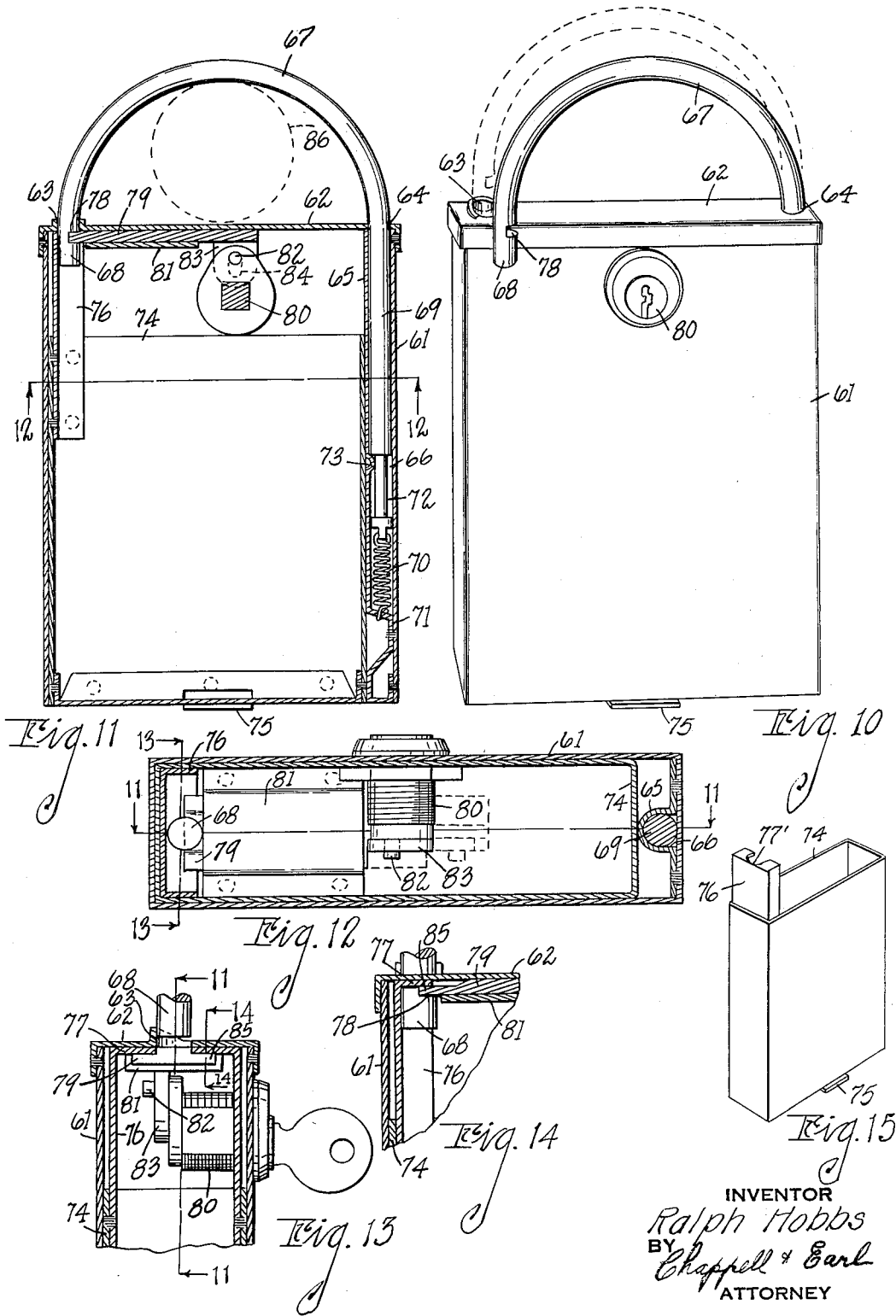

Patented Apr. 24, 1934

1,955,809

UNITED STATES PATENT OFFICE 1,955,809

SAFETY BOX

Ralph Hobbs, Grand Rapids, Mich.

Application July 13, 1933, Serial No. 680,220

8 Claims. (Cl. 109—5)

The main objects of this invention are:

First, to provide a safety box for valuables such as money and especially designed for use in transporting valuables or by travelers, transients, and the like while sleeping.

Second, to provide a box of this character, which is strong, durable and relatively inexpensive.

Objects relating to details and economies of my invention will appear from the description to follow. The invention is defined and pointed out in the claims.

A structure which is a preferred embodiment of my invention is illustrated in the accompanying drawings, in which:

Fig. 1 is a view in elevation of a safety box embodying the features of my invention.

Fig. 2 is an enlarged vertical section on a line corresponding to line 2—2 of Fig. 3.

Fig. 3 is an enlarged transverse section taken on a line corresponding to line 3—3 of Fig. 2.

Fig. 4 is an enlarged fragmentary section on a line corresponding to line 4—4 of Fig. 2.

Fig. 5 is a perspective view of the bolt in inverted position.

Fig. 6 is a perspective view of the outer cover and inner bottom casings constituting the box before assembly.

Fig. 7 is a fragmentary view of a modification, a portion being in section on a line corresponding to line 7—7 of Fig. 9.

Fig. 8 is a view in side elevation of the inner bottom casing of the modification.

Fig. 9 is an enlarged transverse section on a line corresponding to line 9—9 of Fig. 7.

Fig. 10 is a perspective view of a safety box embodying a further modification of my invention.

Fig. 11 is a transverse vertical section of this modification on a line corresponding to line 11—11 of Figs. 12 and 13.

Fig. 12 is a transverse horizontal section on a line corresponding to line 12—12 of Fig. 11.

Fig. 13 is an enlarged fragmentary detail section on a line corresponding to line 13—13 of Fig. 12.

Fig. 14 is a fragmentary detail section on a line corresponding to line 14—14 of Fig. 13.

Fig. 15 is a perspective view of the inner box of this modification.

Referring to Figs. 1 to 6, inclusive, of the drawings, there is illustrated a safety box 1 comprising an inner box 2 and a cover or casing 3 adapted to receive the inner box in telescopic relation with the box fitting snugly within the casing and the lower edges of the walls of the casing extending to the bottom of the box. The box is provided with a side wall extension 4 terminating at its upper end in an inturned flange 5 constituting a keeper. The box and its casing are formed of some durable material such as sheet steel and the outer casing has a side wall 6 conformed to provide an inwardly facing vertical way 7.

The top 8 of the casing has openings 9 and 10 near opposite walls thereof for the arms 11 and 12, respectively, of the bail 13, the arm 11 being elongated and disposed in the way 7, the opening 9 being alined with the way for this purpose. The arms of the bail are provided with stops 14 engageable with the top 8 for limiting the downward or inward movement of the bail relative to the casing. The arm 11 is disposed in the way 7 for longitudinal and rotary movement and is provided with a section 15 of reduced diameter for coaction with the upper outturned lug 16 on the wall or liner 17 which is disposed between the walls of the box and casing and is secured to the wall 6 of the casing. The lug 16 coacts with the section 15 of the arm 11 to limit the outward movement thereof within the way, a compression spring 18 being disposed in the way between the lower end of the arm 11 and the supporting lug 19 to urge the bail outwardly.

Mounted within and at the upper end of the casing is a lock 20 having a bolt 21 and a cam 22 for actuating the same. The bolt 21 is provided with a depending cam follower 23 and depending ears 24, the latter being provided with cross slots 25 for receiving the keeper 5 on the wall extension 4 of the box when the bolt is in locking position. The upper end of the inner wall 17 is slotted at the top to receive the outer end of the bolt, permitting it to engage the notch 26 provided therefor in the arm 11 of the bail. The bolt is mounted for reciprocatory movement on the inner side of the top 8 by means of the channeled support 27. Compression springs 28 are disposed in slots 29 provided therefor in opposite sides of the bolt and act to urge the bolt toward locking position. The inner ends of the springs 28 seat on lugs 30 turned inwardly from the support 27.

The box is projected from the casing by a slide or plunger 31 which is actuated by the compression spring 32 to engage the upper edge of a side wall of the box 2. The slide 31 is mounted for reciprocatory movement in the way formed on the inner side of the casing by the channel-shaped member 33. The movement of the slide is limited by the coaction of the pin 34 thereon with the slot 35 in the member 33.

With the parts thus arranged, a safety box is provided which may be locked against opening and also be secured to a stationary member such as an upright or post 36 of a bed or the like, the upright being indicated in dotted lines in Fig. 1. When the lock 20 is unlocked by means of the key 37, the spring 18 acts to project the bail 13 outwardly while the spring 30 acts to eject the box. The parts are assembled and locked by first sliding the box 2 within the casing 3 and then closing the bail 13 and pushing the same into the casing.

Referring to Figs. 7 to 9, inclusive, there is illustrated a modification wherein the safety box 41 comprises a casing 42 and box 43, the casing being adapted to telescopically receive the box. In this case, the box is provided with a false bottom 44 which is spaced from the true bottom 45 to provide a chamber in which is disposed the lock 47. The opposite side walls 48 of the casing are provided with slots 49 for the passage of the oppositely disposed bolts 50.

The side walls of the box are also conformed to provide outwardly facing ways 51 for the arms 52 of the bail 53. The arms have stops 54 coacting with the top 55 of the casing to limit the inward movement of the bail. The lock is actuated by the key 56 which is inserted from the bottom of the box.

Referring to Figs. 10 to 15, inclusive, there is illustrated a further modification provided with a casing 61 having a closure 62 with openings 63 and 64 near its ends. A vertical way member 65 is mounted within the casing with its way 66 alined with the opening 64. The bail 67 has a short arm 68 coacting with the other opening 63 and a long arm 69 rotatably and slidably disposed through the opening 64 and way 66. The tension spring 70 is connected to the lower end of the arm 69 and the offset 71 in the way member for urging the long arm and the bail 67 inwardly.

The long arm 69 is provided with a reduced portion 72 which coacts with the stop 73 formed in the way member for limiting the relative longitudinal movement between the casing and bail. A box 74 is telescoped within the casing and is provided with opposed finger pieces 75 overlapping the bottom edges of the side walls of the casing. A wall extension 76 is mounted on the box and has a top flange 77 provided with a slot 77' for the passage of the short arm 68 of the bail. This short arm has a recess 78 which is adapted to receive the bolt 79 of the lock 80 mounted within the casing. The bolt 79 is adapted to reciprocate in the way 81 when actuated by the crank pin 82 of the lock, the bolt having a depending lug 83 provided with a slot 84 receiving said pin.

When in locked position, the bolt 79 not only engages the recess 78 in the short arm of the bail, but also engages the flange 77 at the upper end of the wall extension 76. For this purpose, the outer end 85 of the bolt is of reduced thickness.

With the parts thus arranged, the bail remains in assembled relation with the support 86 when the bail is unlocked, as illustrated by Fig. 10. In order to remove the bail from the support, it is necessary to swing the casing through an arc of approximately 90° or more. This is a very useful feature especially at night when it is desired to gain access to the contents of the box without removing the casing from the support. The finger pieces 75 on the bottom of the box facilitate its removal from within the casing.

It will be observed that in each embodiment the bolt or bolts coact with the bail and with the box and casing to secure or lock the same in assembled relation. Thus, only one lock is required and the parts may be locked or unlocked by a single manipulation of the key. The box is secure, durable and relatively inexpensive and may be used in the home as well as while traveling.

I have illustrated and described my improvements in embodiments which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. A safety box comprising in combination a casing having a closure provided with openings near its ends, a vertical way member mounted within said casing with its way alined with one of said openings, a bail having a short arm in the other of said openings and a long arm in said way, a tension spring in said way urging said long arm and bail inwardly, said long arm and way having coacting means limiting their relative longitudinal movement, a box telescoped within said casing and having opposed finger pieces overlapping the bottom edges thereof, a wall extension mounted on said box and having a top flange provided with a slot for the passage of said short arm, said short arm having a recess, and a lock mounted within said casing and having a bolt adapted to engage the recess in said short arm and said flange to secure the parts in assembled relation.

2. A safety box comprising in combination a casing having a closure provided with openings near its ends, a vertical way member mounted within said casing with its way alined with one of said openings, a bail having a short arm in the other of said openings and a long arm in said way, a tension spring in said way urging said long arm and bail inwardly, said long arm and way having coacting means limiting their relative longitudinal movement, a box telescoped within said casing, a wall extension mounted on said box and having a top flange provided with a slot for the passage of said short arm, said short arm having a recess, and a lock mounted within said casing and having a bolt adapted to engage the recess in said short arm and said flange to secure the parts in assembled relation.

3. A safety box comprising in combination a box having a wall extension terminating in an inturned flange constituting a keeper, a casing adapted to receive said box in telescopic relation and having a vertical way in a wall thereof, the top of said casing having a pair of openings, one of which is alined with said way, a bail having its arms disposed in said openings, one of the arms being elongated, disposed in said way, and having a reduced section providing spaced shoulders, an inner wall disposed between said way and a wall of said box and secured to said casing wall, said inner wall having an upper outturned lug coacting with said spaced shoulders to limit the upward movement of said bail and a lower outturned lug spaced below said elongated arm of said bail, a tension spring disposed in said way between the lower end of said elongated arm and said last named lug for urging said bail inwardly, one of said bail arms having a transverse recess, and a lock including a bolt mounted on the inner side of said casing top for coaction with said recess and said flange when the bolt is in locked position.

4. A safety box comprising in combination a box having a wall extension terminating in an inturned flange constituting a keeper, an outer casing adapted to receive said box in telescopic relation and having a vertical way in a wall thereof, the top of said outer casing having a pair of openings, one of which is alined with said way, a bail having its arms disposed in said openings, one of the arms being elongated and disposed in said way, and one of the arms having an inwardly facing transverse recess, a spring disposed in said way and coacting with said elongated arm for urging said bail longitudinally, and a lock including a bolt mounted within said casing for coaction with said recess and said flange when the bolt is moved to locked position.

5. A safety box comprising in combination a box having a wall extension terminating in an inturned flange constituting a keeper, a casing adapted to telescopically receive said box with the bottom edges of the casing walls flush with the bottom of the box, said casing having a vertical way, a bail associated with said casing and having an arm disposed in said way, the bail having a transverse recess, and a lock mounted in said casing and having a bolt for coaction with said recess and keeper to secure the parts in assembled relation.

6. A safety box comprising in combination a box having a keeper, a casing adapted to telescopically receive said box, said casing having a vertical way, a bail associated with said casing and having an arm disposed in said way, the bail having a transverse recess, and a lock within said casing and having a bolt for coaction with said recess and keeper to secure the parts in assembled relation.

7. A safety box comprising in combination a box, a casing adapted to receive said box in telescopic relation and having an internal way, a bail having an arm disposed in said way and the bail being provided with a transverse recess, said box having a keeper alined with said recess, and a lock provided with a transverse reciprocatory bolt for coaction with said recess and keeper to secure the box, bail and casing in assembled relation.

8. A safety box comprising in combination a box, a casing adapted to receive said box in telescopic relation, a bail associated with said box and casing, said bail and box having keepers, and a lock in the casing and provided with a bolt for coaction with said keepers to secure the box, casing and bail in assembled relation with the box within the casing.

RALPH HOBBS.